United States Patent
Clapp et al.

(10) Patent No.: US 7,206,386 B2
(45) Date of Patent: Apr. 17, 2007

(54) METHOD AND SYSTEM FOR ELECTRONIC COMMUNICATION WITH THE HEARING IMPAIRED

(75) Inventors: Glenn Daniel Clapp, Sandy, UT (US); Michael Drew Flathers, Alpine, UT (US); Carlo Johannes Bos, West Jordan, UT (US); Edward Franz Armstrong, American Fork, UT (US); Scot Lorin Brooksby, Highland, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 0 days.

(21) Appl. No.: 10/831,460

(22) Filed: Apr. 23, 2004

(65) Prior Publication Data

US 2005/0238143 A1 Oct. 27, 2005

(51) Int. Cl.
*H04M 11/00* (2006.01)

(52) U.S. Cl. .................................. 379/52; 379/93.15

(58) Field of Classification Search .................. 379/52, 379/115.01, 93.17, 88.14, 88.12, 93.18, 93.24, 379/93.26, 365.01, 265.02, 265.13, 266.01, 379/266.02, 93, 365.02

See application file for complete search history.

(56) References Cited

U.S. PATENT DOCUMENTS

| | | | |
|---|---|---|---|
| 4,799,255 A * | 1/1989 | Billinger et al. ....... | 379/115.01 |
| 5,163,081 A | 11/1992 | Wycherley et al. | |
| 5,333,133 A | 7/1994 | Andrews et al. | |
| 5,533,108 A | 7/1996 | Harris et al. | |
| 5,680,443 A * | 10/1997 | Kasday et al. ................ | 379/52 |
| 5,787,148 A | 7/1998 | August | |
| 5,917,888 A * | 6/1999 | Giuntoli ....................... | 379/52 |
| 5,926,539 A | 7/1999 | Shtivelman | |
| 5,940,475 A * | 8/1999 | Hansen ........................ | 379/52 |
| 5,982,853 A | 11/1999 | Liebermann | |
| 6,031,905 A | 2/2000 | Furman et al. | |
| 6,046,762 A | 4/2000 | Sonesh et al. | |
| 6,249,681 B1 | 6/2001 | Virtanen | |
| 6,389,132 B1 | 5/2002 | Price | |
| 6,477,239 B1 | 11/2002 | Ohki et al. | |
| 6,683,937 B1 | 1/2004 | Watson et al. | |
| 6,694,008 B1 | 2/2004 | Mukherji et al. | |
| 6,724,886 B1 * | 4/2004 | Watson ........................ | 379/52 |
| 2002/0077128 A1 | 6/2002 | Okun et al. | |
| 2005/0232169 A1 * | 10/2005 | McLaughlin et al. ....... | 370/261 |

FOREIGN PATENT DOCUMENTS

| | | |
|---|---|---|
| EP | 0 821 510 A2 | 1/1998 |
| EP | 0 848 552 A1 | 6/1998 |
| WO | WO 99/14951 | 3/1999 |

* cited by examiner

*Primary Examiner*—Stella Woo
(74) *Attorney, Agent, or Firm*—TraskBritt

(57) ABSTRACT

A system and method for electronic communication with the hearing impaired is disclosed, which includes a video relay service having a video relay service application configured to receive the called party number over the first connection and request interpretive services. The video relay service application, initiates when interpretive services are available. The video relay service times a duration of concurrent connection of the first and second connections.

16 Claims, 4 Drawing Sheets

METHOD AND SYSTEM FOR ELECTRONIC COMMUNICATION WITH THE HEARING IMPAIRED

BACKGROUND OF THE INVENTION

1. Field of the Invention

The present invention relates to telecommunication services between a deaf or hearing-impaired person and a nonhearing-impaired or hearing-capable person. More particularly, the invention relates to the establishment of a communication session between a hearing-impaired and a hearing-capable user that enables the hearing-impaired user to communicate using efficient communicative techniques, such as through the use of sign language.

2. State of the Art

Text-based communication devices (e.g., TTY devices) have been used to facilitate the flow of conversation between a hearing-impaired party and a hearing-capable party. However, even with the best technology implemented, such a solution does not convey the emotion or visual cues that are vital to human communication. Additionally, while text-based messaging is convenient and easy to implement, such a method of communication is a more inefficient means of communication for the hearing impaired.

Under the guidance of Title IV of the Americans with Disabilities Act of 1990, telecommunication services were mandated to provide hearing-and speech-impaired parties with functional equivalents of the telecommunication services of hearing-and speech-capable parties. Accordingly, various approaches were implemented with one being a Video Relay Service (VRS). The VRS was developed to allow hearing-impaired users to converse in sign language over an imaging device with hearing-capable users that utilize standard telecommunication services, such as the Public Switched Telephone Network (PSTN). Various implementations of establishing a communication session between a hearing-impaired party and a hearing-capable party have been proposed and implemented. To present, the establishment of such a communication channel has required significant human intervention and a significant amount of time to establish a communication session that is facilitated by an intermediary, such as an interpreter.

BRIEF SUMMARY OF THE INVENTION

The present invention is directed to a method and system for electronic communication with the hearing impaired. In one embodiment of the present invention, a video relay service is provided. The video relay service includes a video relay service application configured to receive the called party number over the first connection and request interpretive services. The video relay service application is further configured to be responsive to the availability of the interpretive services and to initiate in response thereto a second connection with a hearing-capable user according to the called party number. The video relay service times a duration of concurrent connection of the first and second connections. The video relay service further includes interpretive services including an interpretive terminal configured to effectuate the interpretive services between the hearing-impaired user of the first connection and the hearing-capable user of the second connection.

In another embodiment of the present invention, a method for electronic communication with a hearing-impaired user is provided. The method includes receiving a called party number at a video relay service in response to a first connection with a video phone of the hearing-impaired user, the called party number designating a voice phone of a hearing-capable user. Furthermore, in response to receiving the called party number, the method further includes requesting an interpreter terminal to effectuate interpretive services during a communication session between the hearing-impaired user and the hearing-capable user. The interpreter terminal initiates a second connection with the voice phone according to the called party number and when the second connection is established, timing a duration of time when the first connection and the second connection are concurrent.

In yet another embodiment of the present invention, a method for electronic communication with a hearing-impaired user is provided. The method includes receiving a called party number at a video relay service in response to a first connection with the hearing-capable user, the called party number designating a telephone of a hearing-impaired user. Furthermore, in response to receiving the called party number, the method further includes requesting an interpreter terminal to effectuate interpretive services during a communication session between the hearing-capable user and the hearing-impaired user. Thereafter, the interpreter terminal initiates a second connection with a hearing-impaired user according to the called party number and when the second connection is established, a duration of time is measured during concurrent connection between the first connection and the second connection.

In yet a further embodiment of the present invention, a method for communicating between a hearing-impaired user and a hearing-capable user is provided. The method includes establishing a first communication connection between a video phone and a video relay service and forwarding a called party phone number to the video relay service. The method further includes establishing according to the called party number a second communication connection between the video relay service and the voice phone and interpreting between video and audio information for receipt and delivery to the video phone and the voice phone, respectively.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
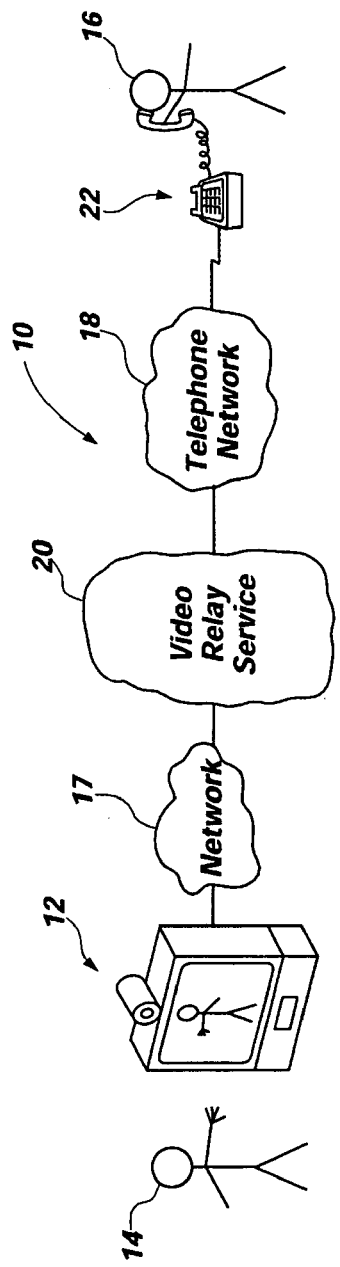
FIG. 1 illustrates a hearing-impaired communication system, in accordance with an embodiment of the present invention.

FIG. 1 illustrates a hearing-impaired communication system configured to facilitate a communication session between a hearing-impaired user and a hearing-capable user, in accordance with an embodiment of the present invention. A hearing-impaired communication system 10 enables a hearing-impaired user 14 to engage in conversation through a communication system with a hearing-capable user 16. A communication session between the users is facilitated through the use of various equipments, which are preferably coupled together using various networks, including a telephone network, such as the Public Switch Telephone Network (PSTN).

To interface a hearing-impaired user into a generally voiced-based communication system, interpretive services are employed, which allow hearing-impaired users to communicate with an interpreter, namely through sign language. The sign language images are then translated by video relay service 20 and when translated into voice information, are then forwarded over a voice-based communication connection to a hearing-capable user. One means for relaying the communicative expressions of a hearing-impaired user 14 within hearing-impaired communication system 10 incorporates a video phone 12 for capturing and displaying the communicative expressions exhibited by hearing-impaired user 14 and for displaying interpreted voice information originating from the hearing-capable user. The expressions, such as sign language and/or body language, may be interpreted or translated by video relay service 20. Hearing-capable user 16 interacts in a conventional manner with video relay service 20 through the use of a voice-based dialogue conveyed over a conventional telephone or voice phone 22. The various devices, such as video phone 12 and voice phone 22, are coupled to video relay service 20 using one or more networks 17, 18. To facilitate the enhanced bandwidth needs of video phone 12, network 17 may be implemented as a high bandwidth network such as a DSL, Cable, Ethernet or other enhanced-bandwidth networking technology. Network 18 may be implemented according to the standards and bandwidth requirements of voice phone 22.

Figure 2:
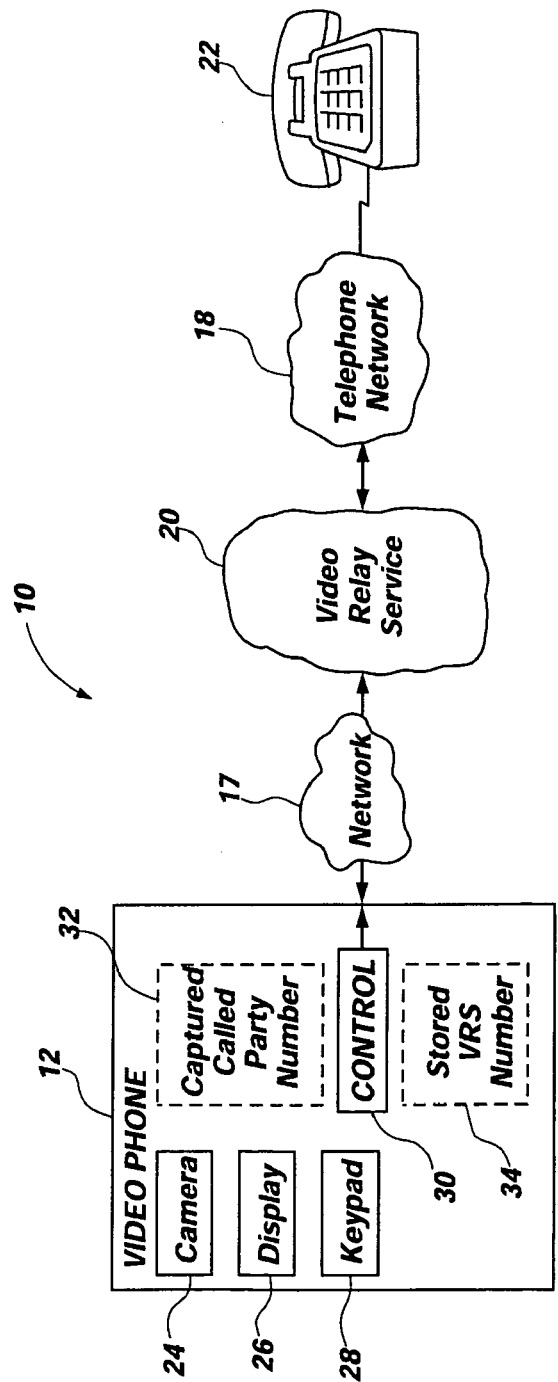
FIG. 2 illustrates a simplified block diagram of a hearing-impaired communication system, in accordance with an embodiment of the present invention.

FIG. 2 is a simplified diagram of a hearing-impaired communication system 10, in accordance with an embodiment of the present invention. To facilitate the interaction with a hearing-impaired user, a video phone 12 includes video components, including a camera 24 for capturing the communicative expression of the hearing-impaired user and further includes a display or monitor 26 for displaying the communicative expressions originating from the hearing-capable user as interpreted by the video relay service 20.

Video phone 12, in accordance with an embodiment of the present invention, further includes a keypad 28 or other data entry device configured to enable a hearing-impaired user to initiate a communication session in a conventional manner by entering the telephone number of the hearing-capable user, also known herein as a called party telephone number 32. In accordance with one embodiment of the present invention, the hearing-impaired user is able to interact with video phone 12 to initiate a phone call in a manner consistent with the interaction of a hearing-capable user initiating a phone call using a conventional telephone 22. Specifically, a hearing-impaired user enters, using an input device such as a keypad 28, the called party number that is captured by a control process 30 and stored as a captured called party number 32.

Control process 30 retrieves a stored VRS number 34 and uses the stored VRS number 34 for initiating a connection over network 17 to form a communication session between video phone 12 and video relay service 20. The stored VRS number 34 may be a network address, such an IP address of the video relay service provider, configured to perform interpretive services. Upon the establishment of a communication link, video phone 12, through the use of control process 30, passes the captured called party number 32 for use by video relay service 20 in the establishment of a call between video relay service 20 and a conventional telephone 22 of the hearing-capable user over telephone network 18.

Figure 3:
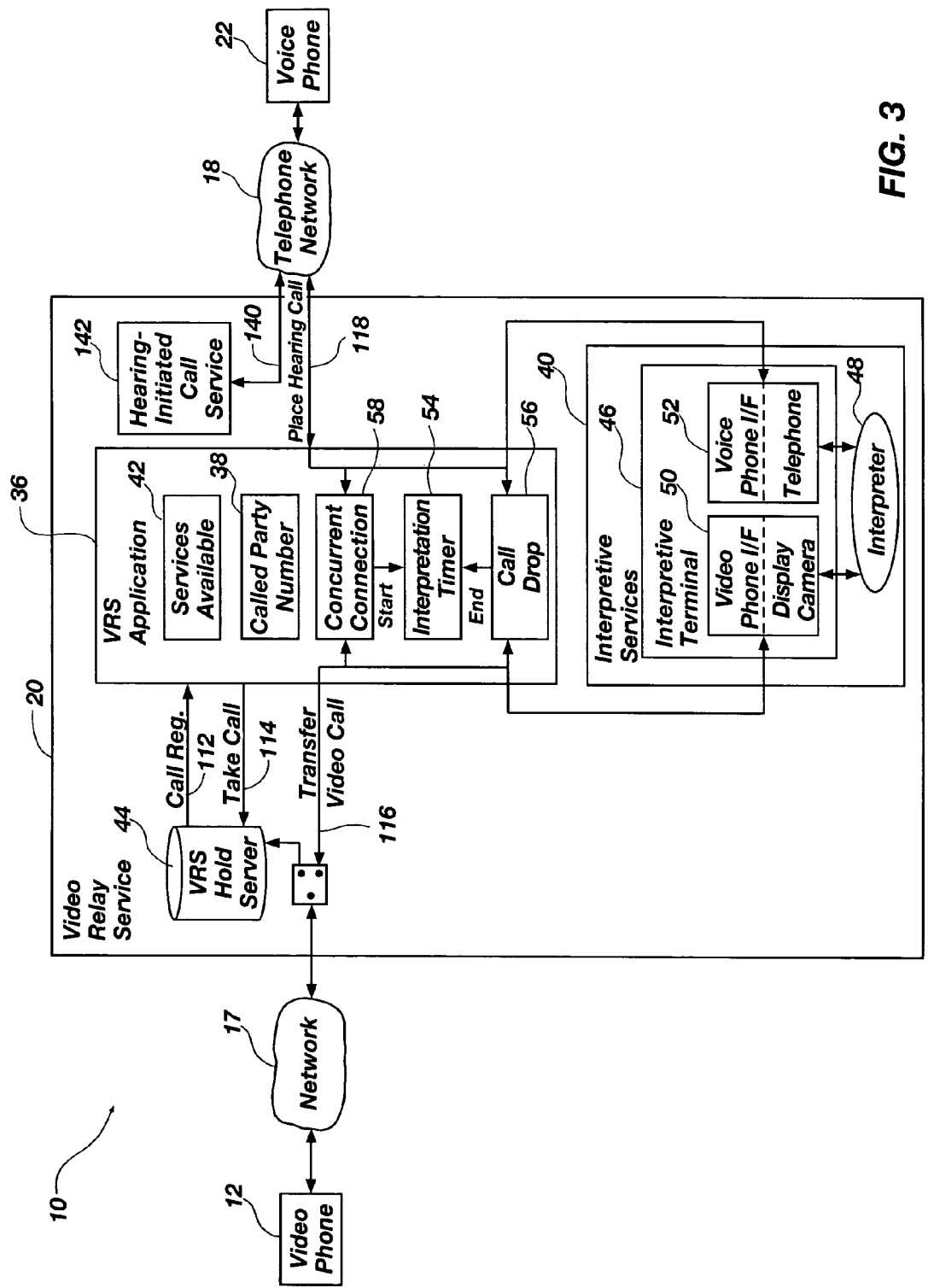
FIG. 3 is a functional block diagram of a video relay service configured for operation with a hearing-impaired communication system, in accordance with an embodiment of the present invention.

FIG. 3 is a functional block diagram of a hearing-impaired communication system 10 including a video relay service 20 configured in accordance with an embodiment of the present invention. The video phone 12 and voice phone 22 interoperate via video relay services 20 as further coupled via network 17, 18. Video relay services 20 minimizes operator interaction for establishing a communicative connection between a hearing-impaired user and a hearing-capable user. While the functionality that occurs within video relay services 20 are discussed herein with specific groupings of functionality within specific functional or operative blocks, the respective functionality may be reallocated to other operative blocks or portions resulting in an acceptable and functional service. Such modifications and partitioning are contemplated to be within the scope of the present invention.

Video relay services 20 includes a VRS application 36 that provides generalized control and sequencing of the relay services. VRS application 36 is preferably implemented as executable software operating on a computational platform, such as a computer or other executable device. VRS application 36 operatively interfaces the video relay services 20 to external network 17, 18 coupled to both the hearing-impaired user via video phone 12 and hearing-capable user via voice phone 22, respectively.

VRS application 36 is configured to interface with network 17, 18 to both initiate and receive calls placed thereto. When the video relay service 20 receives a call from a hearing-impaired user, the VRS application 36 receives therein a called party number as originally input by the hearing-impaired user. The called party number designates a target hearing-capable user and is stored within video relay services 20 in called party number storage 38. The video phone 12 and VRS application 36 receive and store the called party number to emulate conventional dialing and initiation of a phone call from the perspective of a hearing-impaired user.

VRS application 36 further requests interpretive services 40 to interpret or translate communicative interaction between hearing-impaired and hearing-capable users. In one embodiment of the present invention, while waiting to determine if services are available 42, video relay services 20 further include a hold server 44, which gives the calling party the sense of being on hold for a temporary amount of time while switching and call routing take place, in addition to any latency associated with the availability of interpretive services 40.

Interpretive services 40 includes an interpretive terminal 46 that provides an interactive environment for an interpreter 48, which may be implemented as an automated service or may be configured as a human operator. To facilitate such an interface with interpreter 48, interpretive terminal 46 further includes a video interface 50, namely a video display and camera, for engaging in a video-based connection with video phone 12. Furthermore, to facilitate an interface with voice phone 22, interpretive terminal 46 further includes a voice interface 52 for facilitating communication between interpreter 48 and a hearing-capable user utilizing voice phone 22.

When video relay services 20 are applied to a commercial environment, timing of the connection with the interpretive services is important in order to provide an accurate measurement for use in billing for the interpretive services. Interpretive services generally commence once concurrent connections are established between video phone 12 and interpretive services 40 and between voice phone 22 and interpretive services 40. Any delay in measuring the concurrency of the connection may result in lost revenues. In accordance with an embodiment of the present invention, when such connections are concurrent, an interpretation timer 54 is started and is maintained until one or both connections are terminated or dropped. A call termination or drop monitor 56 determines when to end or stop interpretation timer 54, while a concurrent connections monitor 58 determines when to commence or start timing of interpretive services.

The establishment of a communication session between a hearing-impaired user and a hearing-capable user may be initiated by either party. Accordingly, FIG. 4 is a flow diagram illustrating a call initiated by a hearing-impaired user, in accordance with an embodiment of the present invention while FIG. 5 is a flow diagram illustrating a call initiated by a hearing-capable user directed toward a hearing-impaired user, in accordance with another embodiment of the present invention.

Figure 4:
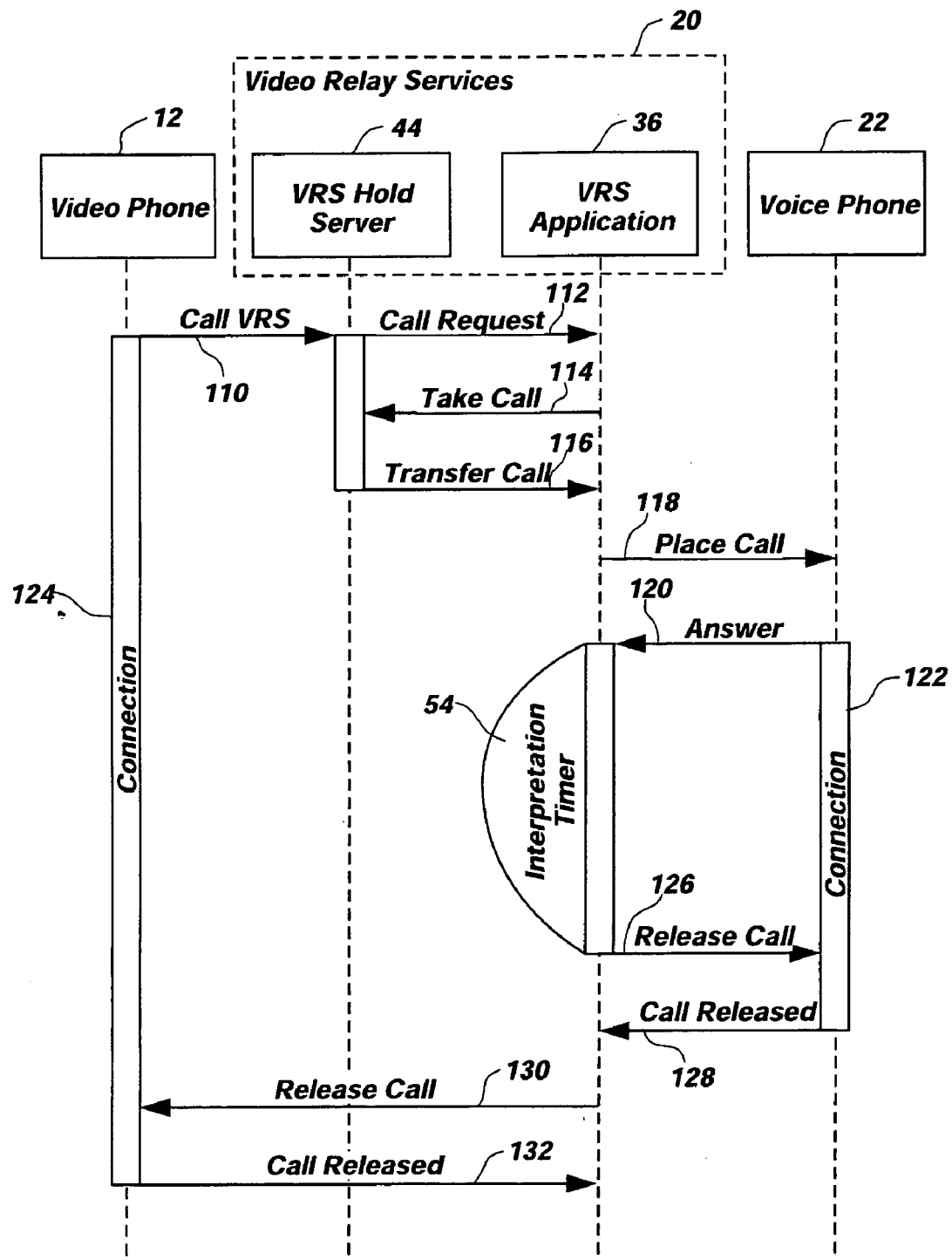
FIG. 4 is a flow diagram illustrating a call initiated by a hearing-impaired user, in accordance with an embodiment of the present invention.

With reference to FIG. 4, a hearing-impaired user utilizing video phone 12 initiates a call to a hearing-capable user by inputting the telephone number of the hearing-capable user. Video phone 12 retrieves a number stored therein, namely the stored VRS number 34 (FIG. 2) and stores the captured call party number 32 (FIG. 2) within video phone 12. Using the stored VRS number 34 (FIG. 2), video phone 12 initiates 110 a connection to video relay services 20 (FIG. 3), which, in one embodiment of the present invention, is routed to VRS hold server 44 while awaiting the availability of interpreter. In one embodiment of the present invention, the VRS hold server 44 issues a call request 112 to the VRS application 36 informing the VRS application 36 of the request for a communication session between a hearing-impaired user and a hearing-capable user.

In response thereto, and when services become available as determined by an available service 42 (FIG. 3), VRS application 36 notifies 114 the VRS hold server 44 that interpretive services are available. Thereupon VRS hold server 44 transfers 116 the video call to VRS application 36, which initiates 118 a call to voice phone 22 according to the received called party number 38 (FIG. 3) as received from video phone 12. When the call placed voice phone 22 is answered 120 by a hearing-capable user forming a connection 122 between voice phone 22 and video relay services 20 interpretation timer 54 is activated to time the concurrent session formed by connections 122 and 124. When the call/connection is dropped 56 (FIG. 3) by either user, then interpretation timer 54 stops and the duration of the interpretive session may be recorded for monitoring or billing purposes. With reference to FIG. 4, the call may be released 126, 128 by VRS application 36, which releases connection 122, followed by subsequent release 130, 132 of connection 124.

Figure 5:
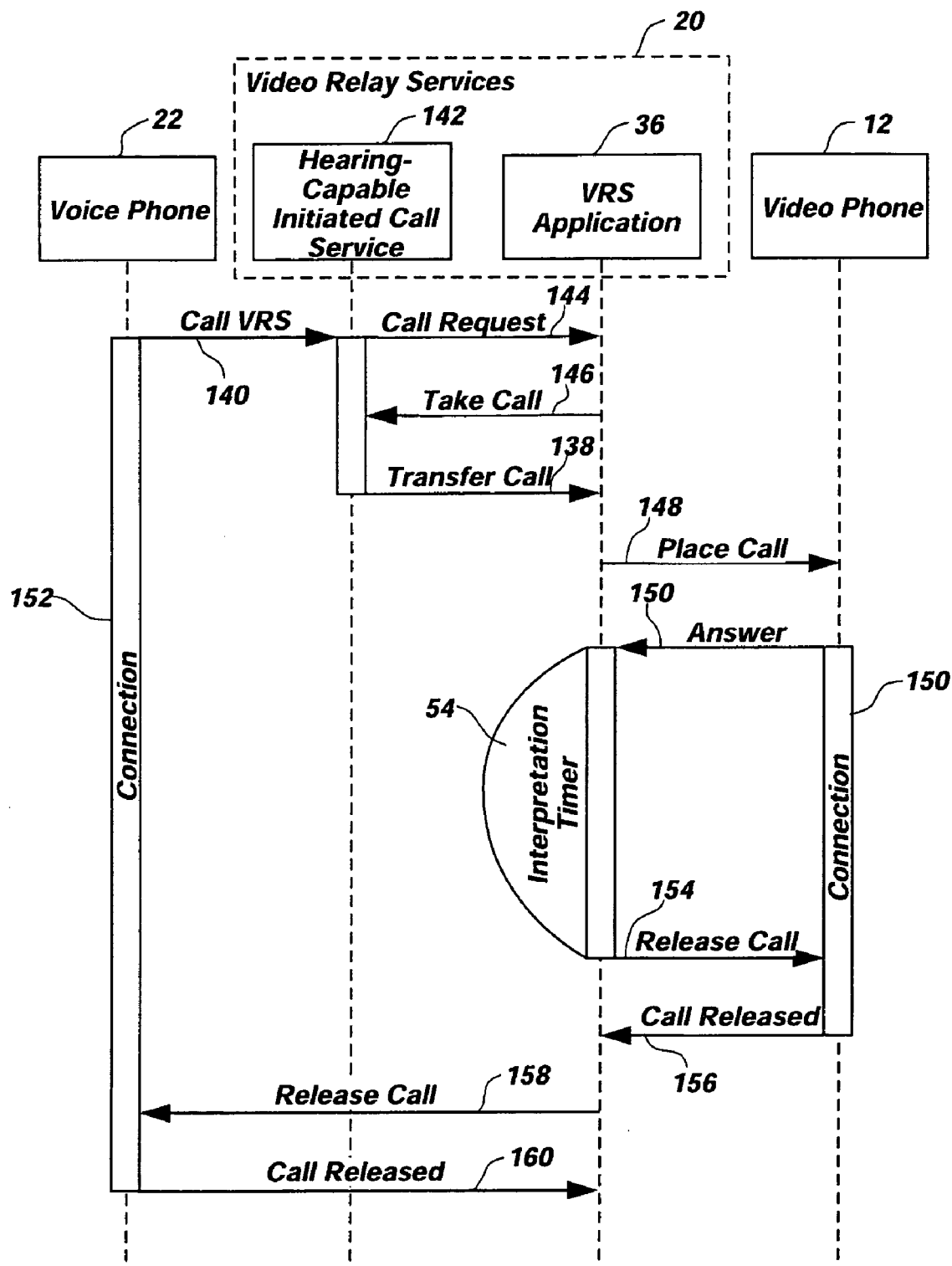
FIG. 5 is a flow diagram illustrating a call initiated by a hearing-capable user directed to a hearing-impaired user, in accordance with an embodiment of the present invention.

FIG. 5 is a flow diagram illustrating a call initiated by a hearing-capable user directed to a hearing-impaired user, in accordance with an embodiment of the present invention. A voice phone 22, under the direction of a voice-capable user, requests interpretive services for communicating with a hearing-impaired user by calling VRS 140 a video relay service 20 using an available or known VRS telephone number. Video relay services 20 include a hearing-capable initiated call service 142, which requests from the hearing-capable user an IP address or a mappable phone number of the hearing-impaired user. Such an inquiry may occur through an automated or manual means, such as through the use of a recorded message that requests the hearing-capable user to key in the telephone number of the targeted hearing-impaired user.

The hearing-capable initiated call service 142 initiates 144 call request to VRS application 36, which then takes 146 and transfers 138 the call to VRS application 36. VRS application 36 initiates 148 a call to video phone 12 and when answered 150, starts or activates interpretation timer 54. As previously described, interpretation timer 54 resumes timing of the interpretive session through the duration of the concurrency of both connections 150, 152 until one or both connections 150, 152 are released. With reference to FIG. 5, VRS application 36 releases 154, 156 connection 150 causing interpretation timer 54 to stop timing the duration of the interpretive services. Similarly, VRS application 36 releases 158, 160 connection 152 whereupon the communication session between the hearing-capable user and the hearing-impaired user is terminated.

While one sequencing of the termination of connections is illustrated with reference to FIG. 4 and FIG. 5, it is also contemplated that either or both users may terminate the connection thereby causing interpretation timer 54 to suspend measurement of a timing duration of the interpretive services. It is also contemplated that the hearing-capable initiated call service 142 of FIG. 5 may be implemented in an automatic manner or may be implemented using human intervention.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A video relay service system, comprising:
a video relay service application configured to cooperatively establish a first connection with a video phone according to a video relay service phone number stored within the video phone as initiated by the receipt of a called party number at the video phone and to receive the called party number over the first connection in response to the formation of the first connection and request interpretive services, the video relay service application further configured as responsive to availability of the interpretive services and to initiate in response thereto a second connection with a hearing-capable user according to the called party number, the video relay service system yet further configured to time a duration of concurrent connection of the first and second connections; and
interpretive services including an interpretive terminal configured to effectuate the interpretive services between a hearing-impaired user of the first connection and the hearing-capable user of the second connection.

2. The video relay service system of claim 1, further comprising a hold server for holding the first connection until the interpretive services are available as designated by the interpretive terminal.

3. The video relay service system of claim 1, wherein the video relay service application comprises an interpretation timer configured to start in direct response to concurrent establishment of both the first and second connections and stop in direct response to termination of one of the first and second connections.

4. The video relay service system of claim 1, wherein the video relay service application is further configured to directly initiate the second connection when the interpretive services become available.

5. A system for electronic communication with a hearing-impaired user, comprising:
   a video phone configured to capture and store a dialed number as a called party number designating a voice phone of a hearing-capable user and further configured to establish a first connection in response to the dialed number according to a video relay service phone number stored within the video phone;
   a video relay service application configured to receive the dialed number over the first connection and request interpretive services, the video relay service application further configured to be responsive to availability of the interpretive services and initiate in response thereto a second connection with a hearing-capable user according to the dialed number, the video relay service yet further configured to time a duration of concurrent connection of the first and second connections; and
   an interpretive terminal configured to effectuate the interpretive services between the hearing-impaired user and the hearing-capable user.

6. The system of claim 5, further comprising a hold server for holding the first connection until the interpretive services are available as designated by the interpreter terminal.

7. The system of claim 5, wherein the video relay service application comprises an interpretation timer configured to start in direct response to concurrent establishment of both the first and second connections and stop in direct response to termination of one of the first and second connections.

8. The system of claim 5, wherein the video phone is further configured to store therein a video relay service phone number designating a video relay service for providing the interpretive services between the hearing-impaired user and the hearing-capable user.

9. A method for electronic communication with a hearing-impaired user, comprising:
   receiving a called party number at a video relay service over a first connection in response to the formation of the first connection with a video phone of a hearing-impaired user, the called party number designating a voice phone of a hearing-capable user, wherein receiving the called party number comprises:
      establishing a first connection between the video phone and the video relay service according to a video relay service phone number stored within the video phone; and
      forwarding a called party number as entered at the video phone to initiate the first connection;
   in response to receiving the called party number, requesting an interpreter terminal to effectuate interpretive services during a communication session between the hearing-impaired user and the hearing-capable user;
   the interpreter terminal initiating a second connection with the voice phone according to the called party number; and
   when the second connection is established, timing a duration of time when the first connection and the second connection are concurrent.

10. The method of claim 9, further comprising holding the first connection at a hold server until the interpreter terminal is available to effectuate the interpretive services.

11. The method of claim 9, wherein the initiating the second connection is initiated directly by the interpreter terminal when the interpreter services become available.

12. The method of claim 9, wherein the timing the duration of time, comprises:
   starting an interpretation timer in direct response to concurrent establishment of both the first and second connections; and
   stopping the interpretation timer in direct response to termination of one of the first and second connections.

13. A method for communicating between a hearing-impaired user and a hearing-capable user, comprising:
   establishing a first communication connection between a video phone and a video relay service by dialing a called party phone number, wherein the establishing the first communication connection comprises:
      storing the called party number in the video phone; and
      establishing a first communication connection between the video phone and the video relay service according to a video relay service phone number stored within the video phone;
   forwarding the called party phone number to the video relay service;
   establishing according to the called party number a second communication connection between the video relay service and the voice phone; and
   interpreting between video and audio information for receipt and delivery to the video phone and the voice phone, respectively.

14. The method of claim 13, further comprising holding the first connection until interpretive services are available to establish the second communication connection.

15. The method of claim 13, further comprising:
   starting an interpretation timer in direct response to concurrent establishment of both the first and second communication connections; and
   stopping the interpretation timer in direct response to termination of one of the first and second communication connections.

16. The method of claim 13, wherein the establishing the second communication connection further comprises waiting until interpretive services are available before establishing the second communication connection between the video relay service and the voice phone.

* * * * *

UNITED STATES PATENT AND TRADEMARK OFFICE
CERTIFICATE OF CORRECTION

PATENT NO. : 7,206,386 B2  Page 1 of 1
APPLICATION NO. : 10/831460
DATED : April 17, 2007
INVENTOR(S) : Glenn Daniel Clapp et al.

It is certified that error appears in the above-identified patent and that said Letters Patent is hereby corrected as shown below:

COLUMN 1  LINE 28  change "hearing-and speech-impaired" to --hearing- and speech-impaired--
COLUMN 1  LINE 30  change "hearing-and speech-capable" to --hearing- and speech-capable--
COLUMN 5  LINE 47  change "When the call placed" to --When the call is placed--
COLUMN 6  LINE 8   change "144 call request" to --144 a call request--

CLAIM 13  COLUMN 8  LINE 27  change "the called party number" to --the called party phone number--
CLAIM 13  COLUMN 8  LINE 35  change "the called party number" to --the called party phone number--

Signed and Sealed this

Twenty-eighth Day of September, 2010

David J. Kappos
*Director of the United States Patent and Trademark Office*